United States Patent [19]

Schmidhauser

[11] Patent Number: 5,856,421
[45] Date of Patent: Jan. 5, 1999

[54] POLYETHERIMIDE PREPARATION METHOD INCLUDING ADDITION OF MACROCYCLIC POLYETHERIMIDE OLIGOMERS

[75] Inventor: John Christopher Schmidhauser, Niskayuna, N.Y.

[73] Assignee: General Electric Company, Schenectady, N.Y.

[21] Appl. No.: 818,987

[22] Filed: Mar. 17, 1997

[51] Int. Cl.$^6$ .................................................. C08G 17/10
[52] U.S. Cl. ........................... 528/125; 528/126; 528/170
[58] Field of Search ...................... 528/125, 126, 528/170

[56] References Cited

U.S. PATENT DOCUMENTS 4,054,577 10/1977 Relles et al. .
5,229,482 7/1993 Brunelle .
5,357,029 10/1994 Takekoshi et al. .
5,514,813 5/1996 Brunelle .

OTHER PUBLICATIONS

European Search Report, Jun. 1998.

Primary Examiner—John M. Cooney, Jr.
Attorney, Agent, or Firm—Noreen C. Johnson; Douglas E. Stoner

[57] ABSTRACT

Macrocyclic polyether oligomers, preferably as mixtures of oligomers of different degrees of polymerization, are incorporated in a direct displacement reaction mixture for the formation of polyetherimides, said reaction mixture comprising at least one alkali metal salt of a dihydroxy-substituted aromatic hydrocarbon and at least one bis(halo- or nitrophthalimide). The macrocyclic oligomers can be isolated from an earlier-prepared linear polyetherimide composition. Their incorporation in the reaction mixture does not increase the proportion of oligomers in the polyetherimide product.

14 Claims, No Drawings

POLYETHERIMIDE PREPARATION METHOD INCLUDING ADDITION OF MACROCYCLIC POLYETHERIMIDE OLIGOMERS

BACKGROUND OF THE INVENTION

This invention relates to the preparation of polyetherimides.

Polyetherimides are a known class of high performance polymers characterized in particular by resistance to high temperature conditions. At least two methods for their preparation from monomeric reagents are known. The first method includes the steps of displacement of a chloro- or nitro-substituted phthalimide with a salt of a dihydroxyaromatic compound followed by conversion of the resulting bisimide to the corresponding dianhydride and its reaction with at least one diamine. This method, hereinafter designated "displacement-condensation", is disclosed in many publications and patents.

The second method, hereinafter designated "direct displacement", is frequently advantageous by reason of minimization of processing steps and by-product formation. It typically comprises the reaction of a salt of a dihydroxyaromatic compound with a bis(halo- or nitrophthalimide). The direct displacement method is also disclosed in numerous patents. Particular reference is made to U.S. Pat. No. 5,229,482, which describes direct displacement in a solvent of low polarity such as a dichloro- or trichloroaromatic compound in the presence of a phase transfer catalyst which is stable at the relatively high reaction temperatures employed. The phase transfer catalysts having this property which are often preferred are the hexaalkylguanidinium halides, especially chlorides and bromides. A similar direct displacement method, employing an alkoxyaromatic compound such as anisole as a solvent is disclosed in copending, commonly owned application Ser. No. 08/799,886.

It is known that formation of many linear polymers, especially condensation polymers such as polycarbonates, polyesters and polyetherimides, is accompanied by the formation of various proportions of macrocyclic oligomers. These oligomers typically comprise principally molecular species having degrees of polymerization from 2 to about 12 and having an overall cyclic configuration, apart from the presence of any aromatic or heterocyclic rings present in the polymer chain, in contrast to the linear polymers which constitute most of the product.

It is also known that macrocyclic polyetherimide oligomers, hereinafter sometimes simply designated "oligomers" for brevity, can be prepared in high yield by various methods. For example, U.S. Pat. No. 5,357,029 describes their preparation by the reaction of diamines with tetracarboxylic acids or their dianhydrides, and U.S. Pat. No. 5,514,813 by the reaction of salts of dihydroxyaromatic compounds with bis(halo- or nitrophthalimides) in the presence of phase transfer catalysts and in specific molar ratios of reactants. The polymerization of these oligomers is preferably conducted in the presence of a primary amine as initiator and a macrocyclic polyimide polymerization catalyst which may be a metal or hydroxide or salt thereof, as further disclosed in said U.S. Pat. No. 5,357,029.

While macrocyclic oligomers are detected in essentially all polyetherimides, those polyetherimides prepared by displacement-condensation generally contain very low proportions thereof, most often no more than 1% by weight. In such proportions, the macrocyclic oligomers have little or no detrimental effect on the properties of the linear polymer.

It has been discovered, however, that the direct displacement method for preparing linear polyetherimides affords a product having a substantially higher proportion of oligomers. Proportions as high as 10% and most often in the range of about 7–8% by weight are typical.

It is possible to separate oligomers from the linear polyetherimide by such methods as anti-solvent precipitation of linears, whereupon the soluble fraction contains a major proportion of oligomers. The previously known methods for polymerizing said oligomers, however, are disadvantageous in this context since the conditions required therefor are different from those of displacement-condensation and direct displacement.

SUMMARY OF THE INVENTION

The present invention is based on the discovery that it is possible to incorporate macrocyclic polyetherimide oligomers in a direct displacement monomer reaction mixture and thereby produce a polymer having a fairly constant and relatively low proportion of oligomers, even if the oligomer proportion in the initial reaction mixture is relatively high. Thus, the oligomers can be recycled to the direct displacement reaction and the resulting product has no higher a proportion of oligomers than would be the case if none were added.

The invention, accordingly, is a method for preparing a polyetherimide composition comprising linear polyetherimides by the reaction of the components of a reaction mixture comprising at least one alkali metal salt of a dihydroxy-substituted aromatic hydrocarbon and at least one bis(halo- or nitrophthalimide), which comprises additionally incorporating in said reaction mixture at least one macrocyclic polyetherimide oligomer having a degree of polymerization from 1 to about 10.

In a preferred embodiment, said macrocyclic oligomer(s) has been isolated from an earlier-prepared composition comprising linear polyetherimides

DETAILED DESCRIPTION; PREFERRED EMBODIMENTS

The alkali metal salts of dihydroxy-substituted aromatic hydrocarbons which are employed for the preparation of polyetherimides according to the present invention are typically sodium and potassium salts. Sodium salts are frequently preferred by reason of their availability and relatively low cost.

Suitable dihydroxy-substituted aromatic hydrocarbons include those having the formula $$HO-A^1-OH \qquad (I)$$

wherein $A^1$ is a divalent aromatic hydrocarbon radical. Suitable A1 radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^1$ radical preferably has the formula $$-A^2-Y-A^3- \qquad (II),$$

wherein each of $A^2$ and $A^3$ is a monocyclic divalent aromatic hydrocarbon radical and Y is a bridging hydrocarbon radical in which one or two atoms separate $A^2$ from $A^3$. The free valence bonds in formula II are usually in the meta or para positions of $A^2$ and $A^3$ in relation to Y. Compounds in which $A^1$ has formula II are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula II, the $A^2$ and $A^3$ values may be unsubstituted phenylene or hydrocarbon-substituted derivatives thereof, illustrative substituents (one or more) being alkyl and alkenyl. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. Illustrative radicals of this type are methylene, cyclohexylmethylene, 2-[2.2.1] bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. For reasons of availability and particular suitability for the purposes of this invention, the preferred radical of formula II is the 2,2-bis(4-phenylene) propane radical, which is derived from bisphenol A and in which Y is isopropylidene and $A^2$ and $A^3$ are each p-phenylene.

It is frequently advantageous to employ a hydrate of the bisphenol salt, e.g., bisphenol A disodium salt hexahydrate, and dehydrate said hydrate prior to forming the polyetherimide. This is true because polyetherimides of particularly high molecular weight are ordinarily formed when a hydrate is so employed.

The bis(halo- or nitrophthalimides) are generally of the formula

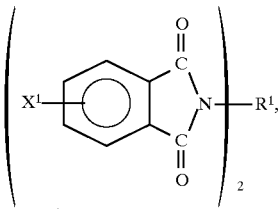

(III)

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

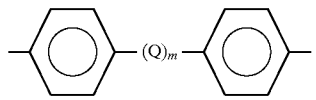

(IV)

in which Q is $-C_2H_4-$, $-O-$,

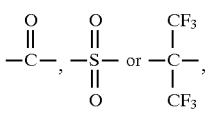

$X^1$ is fluoro, chloro, bromo or nitro and m is 0 or 1. $R^1$ is most often m-phenylene or p-phenylene. In most instances, each $X^1$ is fluoro or chloro.

Among the particularly preferred substituted aromatic compounds of formula III are 1,3- and 1,4-bis[N-(4-fluorophthalimido)]benzene and the corresponding chloro compounds.

A third material usually employed according to the present invention is a solvent of low polarity, usually substantially lower than that of the dipolar aprotic solvents previously employed for the preparation of aromatic polyether polymers. Said solvent preferably has a boiling point of at least about 150° C., in order to facilitate the reaction which requires temperatures in the range of about 150°–225° C. Suitable solvents of this type include o-dichlorobenzene, dichlorotoluene, 1,2,4-trichlorobenzene, diphenyl sulfone and anisole. Solvents of similar polarity but lower boiling points, such as chlorobenzene, may be employed at superatmospheric pressures.

Also generally employed is a phase transfer catalyst, preferably one which is substantially stable at temperatures in the range of about 180°–225° C. Various types of phase transfer catalysts may be employed for this purpose. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482.

The preferred phase transfer catalysts, by reason of their exceptional stability at high temperatures and their effectiveness to produce polyetherimides in high yield, are the hexaalkylguanidinium salts and α,ω-bis (pentaalkylguanidinium)alkane salts and their heterocyclic analogs. For the sake of brevity, both types of salts are hereinafter sometimes designated "guanidinium salt".

According to the present invention, the reaction mixture comprising the dihydroxy-substituted aromatic hydrocarbon salt and the bis(halo- or nitrophthalimide) also comprises at least one macrocyclic polyetherimide oligomer. Said oligomer(s) preferably contains structural units with a molecular structure identical to that created by reaction of the aforementioned monomeric reagents; however, it is within the scope of the invention to incorporate oligomers of different molecular structure in the mixture.

It is often preferred to employ a mixture of macrocyclic polyetherimide oligomers having different degrees of polymerization, most often from 1 to about 10, preferably from 2 to about 10 and most preferably from 2 to about 5, since most oligomer preparation methods afford such a mixture and there is little point in separating individual oligomers therein. As will be apparent to those skilled in the art, oligomers having a degree of polymerization of 1 consist of a single structural unit with an overall cyclic structure.

Such mixtures are readily obtainable by methods known in the art. A particular advantage of the invention, however, is the employment of oligomer mixtures which have been isolated from an earlier prepared composition comprising linear polyetherimides. Thus, the macrocyclic oligomers present in a polymer previously prepared by direct displacement can be separated from the linear polymer, typically by anti-solvent precipitation of the linear polymer, and recovered in the form of an oligomer-rich solution.

Anti-solvent precipitation of linear polyetherimides for separation from oligomers may be achieved by combining the polymer solution in the solvent of low polarity with any anti-solvent. Suitable anti-solvents can be identified by simple experimentation; examples are methanol, toluene and acetonitrile. In general, toluene and acetonitrile are preferred since the precipitates resulting therefrom are particularly rich in linear polymer, and hence the liquid phase is particularly rich in oligomers.

This is shown by a comparison of methanol, toluene and acetonitrile as anti-solvents in a procedure in which 150 ml of an anisole solution containing 15 g of polyetherimide was mixed and blended with 400 ml of anti-solvent. The polyetherimide was prepared by the reaction of the disodium salt of bisphenol A with 1,3-bis[N-(4-chlorophthalimido)] benzene and contained about 7.6% macrocyclic polyetherimide oligomers having degrees of polymerization between 2 and 8. The solid material was separated by filtration and the solution was analyzed for the presence of linear high molecular weight polymer and oligomers. The results are listed in Table I.

TABLE I

| Anti-solvent | Precipitate | | Solution | |
|---|---|---|---|---|
| | % linears | % oligomers | % linears | % oligomers |
| Methanol | 93.1 | 6.4 | 80 | 20 |
| Toluene | 99.8 | 0.2 | 30 | 70 |
| Acetonitrile | 96.9 | 3.1 | 10 | 90 |

The bisphenol salt and substituted aromatic compound are brought into contact in substantially equimolar amounts. For maximum molecular weight, the amounts should be as close as possible to exactly equimolar, but molecular weight control may be achieved by employing one reagent or the other in slight excess. It is also within the scope of the invention to employ monofunctional reagents such as monohydroxyaromatic compounds or monohalo- or nitroaromatic compounds as chain termination agents.

Proportions of added macrocyclic oligomers in the reaction mixture are subject to wide variation, since the composition of the polymer obtained is essentially the same irrespective of such proportions. In general, the added oligomers may comprises as little as about 0.5 and as much as about 25 mole percent, based on bisphenol salt.

Reaction temperatures are in the range of about 125°–250° C., preferably about 130°–225° C. The proportion of phase transfer catalyst employed is generally about 0.5–10 and preferably about 1–5 mole percent based on bisphenol salt.

The invention is illustrated by the following examples.

EXAMPLES 1–3

Mixtures of 2.9934 g (7.87 mmol) of bisphenol A disodium salt hexahydrate and 60 ml of o-dichlorobenzene were heated under reflux in a nitrogen atmosphere and water of hydration was removed by distillation. There were then added 3.44 g (7.87 mmol) of 1,3-bis[N-(4-chlorophthalimido)]benzene and an additional 10 ml of o-dichlorobenzene. Heating was continued with the removal of 10 ml of o-dichlorobenzene by distillation, after which 150 mg (0.49 mmol) of hexaethylguanidinium chloride and various proportions of macrocyclic polyetherimide oligomers, prepared from the same reactants, were added. Heating at 220° C. was continued for 4 hours, after which samples were removed and analyzed by gel permeation chromatography. The results are given in Table II, in comparison with a control in which no macrocyclic oligomers were added.

TABLE II

| | Oligomers added, | Oligomers in product, wt % | | | |
|---|---|---|---|---|---|
| Example | mole % | Dimer | Trimer | Tetramer | Pentamer |
| 1 | Trimer, 1.0 | 2.16 | 0.99 | 0.48 | 0.20 |
| 2 | Mixed, 8.0 | 2.56 | 0.93 | 0.40 | 0.18 |

TABLE II-continued

| | Oligomers added, | Oligomers in product, wt % | | | |
|---|---|---|---|---|---|
| Example | mole % | Dimer | Trimer | Tetramer | Pentamer |
| 3 | Mixed, 18.2 | 2.12 | 0.88 | 0.37 | 0.15 |
| Control | — | 2.48 | 0.95 | 0.41 | 0.18 |

It is apparent from Table II that the proportions of oligomers in the product were substantially the same, whether or not oligomers were incorporated in the reaction mixture and irrespective of the proportions of said oligomers in said mixture when incorporated.

What is claimed is:

1. A method for preparing a polyetherimide composition comprising linear polyetherimides by the reaction of the components of a reaction mixture comprising at least one alkali metal salt of a dihydroxy-substituted aromatic hydrocarbon and at least one bis(halo- or nitrophthalimide), which comprises additionally incorporating in said reaction mixture at least one macrocyclic polyetherimide oligomer having a degree of polymerization from 1 to about 10.

2. A method according to claim 1 wherein a mixture of macrocyclic polyetherimide oligomers having different degrees of polymerization is incorporated in said reaction mixture.

3. A method according to claim 2 wherein said mixture of macrocyclic polyetherimide oligomers comprises oligomers having degrees of polymerization from 2 to about 5.

4. A method according to claim 1 wherein the dihydroxy-substituted aromatic hydrocarbon has the formula

$$HO—A^1—OH \quad (I)$$

wherein $A^1$ is a divalent aromatic hydrocarbon radical.

5. A method according to claim 4 wherein $A^1$ has the formula

$$—A^2—Y—A^3— \quad (II),$$

wherein each of $A^2$ and $A^3$ is a monocyclic divalent aromatic hydrocarbon radical and Y is a bridging hydrocarbon radical in which one or two atoms separate $A^2$ from $A^3$.

6. A method according to claim 5 wherein the bis(halo- or nitrophthalimide) has the formula

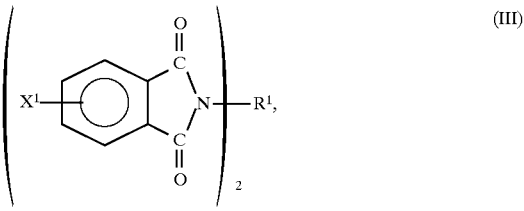

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

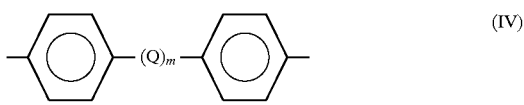

in which Q is —$C_2H_4$—, —O—,

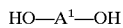

$X^1$ is fluoro, chloro, bromo or nitro and m is 0 or 1.

7. A method according to claim 6 wherein the alkali metal salt is bisphenol A disodium salt and the bis(halo- or nitrophthalimide) is 1,3- or 1,4-bis[N-(4-chlorophthalimido)]benzene.

8. A method according to claim 7 wherein the bisphenol A disodium salt is employed as a hydrate which is dehydrated prior to forming the polyetherimide.

9. A method according to claim 2 further comprising the step of isolating said macrocyclic polyether oligomers from an earlier-prepared composition comprising linear polyetherimides.

10. A method according to claim 9 wherein the dihydroxy-substituted aromatic hydrocarbon has the formula

HO—$A^1$—OH     (I), wherein $A^1$ is a divalent aromatic hydrocarbon radical.

11. A method according to claim 10 wherein $A^1$ has the formula

—$A^2$—Y—$A^3$—     (II)

wherein each of $A^2$ and $A^3$ is a monocyclic divalent aromatic hydrocarbon radical and Y is a bridging hydrocarbon radical in which one or two atoms separate $A^2$ from $A^3$.

12. A method according to claim 11 wherein the bis(halo- or nitrophthalimide) has the formula

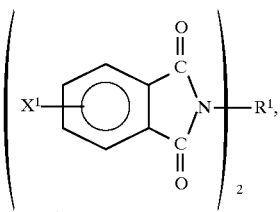
(III)

wherein $R^1$ is a $C_{6-20}$ divalent aromatic hydrocarbon or halogenated hydrocarbon radical, a $C_{2-20}$ alkylene or cycloalkylene radical, a $C_{2-8}$ bis(alkylene-terminated) polydiorganosiloxane radical or a divalent radical of the formula

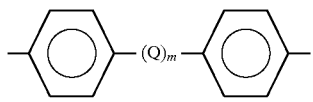
(IV)

in which Q is —$C_2H_4$—, —O—,

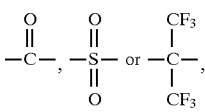

$X^1$ is fluoro, chloro, bromo or nitro and m is 0 or 1.

13. A method according to claim 12 wherein the alkali metal salt is bisphenol A disodium salt and the bis(halo- or nitrophthalimide) is 1,3- or 1,4-bis[N-(4-chlorophthalimido)]benzene.

14. A method according to claim 13 wherein the bisphenol A disodium salt is employed as a hydrate which is dehydrated prior to forming the polyetherimide.

* * * * *